United States Patent [19]

Kang

[11] Patent Number: 4,932,882

[45] Date of Patent: Jun. 12, 1990

[54] ROTARY PLUG

[76] Inventor: Steve Kang, No. 49, Lane 81, Lee Sinn Rd., Sec., Sanchung City, Taipei Hsien, Taiwan

[21] Appl. No.: 369,323

[22] Filed: Jun. 21, 1989

[51] Int. Cl.⁵ ............................................. H01R 39/00
[52] U.S. Cl. ...................................... 439/22; 439/21; 439/676
[58] Field of Search ............................. 439/13, 17–22, 439/27, 76, 344, 676

[56] References Cited

U.S. PATENT DOCUMENTS

| | | | |
|---|---|---|---|
| 1,174,379 | 3/1916 | Bacon | 439/17 |
| 2,721,822 | 10/1955 | Pritkin | 439/18 |
| 3,479,632 | 11/1969 | Galles | 439/21 |
| 4,699,597 | 10/1987 | Gallo et al. | 439/21 |

Primary Examiner—Gary F. Paumen
Attorney, Agent, or Firm—Notaro & Michalos

[57] ABSTRACT

A rotary plug comprises a casing for receiving a cable. Conductive laminates fixed inside the casing are electrically connected to conductors in the cable. A plug with plug body also contain conductive laminates. The plug with its laminates rotates inside the casing. A dual surfaced printed circuit board is installed between the conductive laminates of the plug and those of the cable. A front linear circuit of the dual printed circuit board connects with the conductive laminates of the body of the plug, and a rear circular circuit of the dual printed circuit board contacts the conductive laminates connected to the cable. While the dual printed circuit board rotates along with the body of the plug, the immovable conductive laminates of the cable maintain contact with a point of the rear circular circuit to keep the plug electrically connected to the cable.

2 Claims, 5 Drawing Sheets

ROTARY PLUG

BACKGROUND OF THE INVENTION

The present invention relates in general to electrical plugs, and in particular to a rotary plug which can rotate with respect to the terminal end of a cable which is connected to the plug.

A conventional plug is unable to rotate with respect to the terminal end of a cable connected to the plug. Due to the frequent twisting of the cable, for example, the cable connecting a telephone, the torsion of the twisting of the cable might cause the terminal end of the cable to loosen and even fall off. This has a bad effect on conductance through the terminal end and may even cut-off the power.

Under such circumstance a rotary plug which is able to rotate with respect to the terminal end of a cable connected to the plug is required to avoid twisting of the cable.

SUMMARY OF THE INVENTION

An object of the present invention is to provide, a rotary plug which can rotate relative to the terminal end of a cable connected to the plug.

Another object of the present invention is to provide a small size plug to be used on the cable of a telephone hand set, in order to meet the requirements of the posture of a user holding the phone.

In order to fulfill the above object and other objects not mentioned, the rotary plug has the terminal of the connecting cable inserted into a horn shape casing. Sharp conductive laminates on a conductive laminate seat which is fixed on the casing pierce through a plastic coating of the cable to make electrical contact with conductors in the cable. Another end of the conductive laminates electrically contact a circular circuit on a dual surfaced printed circuit board. The circular circuit and a linear circuit on the other side of the dual surfaced printed circuit board are connected by spot welding, and the linear circuit is contacted by conductive laminates on the inside of the body of the plug. The conductive laminate seat, the dual surfaced printed circuit board, and the body of the plug are contained in the horn shape casing and fixed with a fixing ring and only part of the body of the plug extends out of the casing in order to be inserted into a conventional socket to connect with the plug. On assembling the above elements, the conductive laminate seat is fixed inside the casing, while the dual surfaced printed circuit board and the body of the plug are connected to each other and together rotate within the casing with respect to the conductive laminate seat. In the course of relative rotation, the conductive laminates on the conductive laminate seat maintain electrical contact with the circular circuit on the dual surfaced printed circuit board, to maintain electrical contact with the plug without being affected by the relative rotation.

BRIEF DESCRIPTION OF THE DRAWINGS

The drawings disclose two embodiments of the present invention which serve to exemplify the various advantages and objects hereof, and are as follows.

DETAILED DESCRIPTION OF THE PREFERRED EMBODIMENTS

Figure 1:
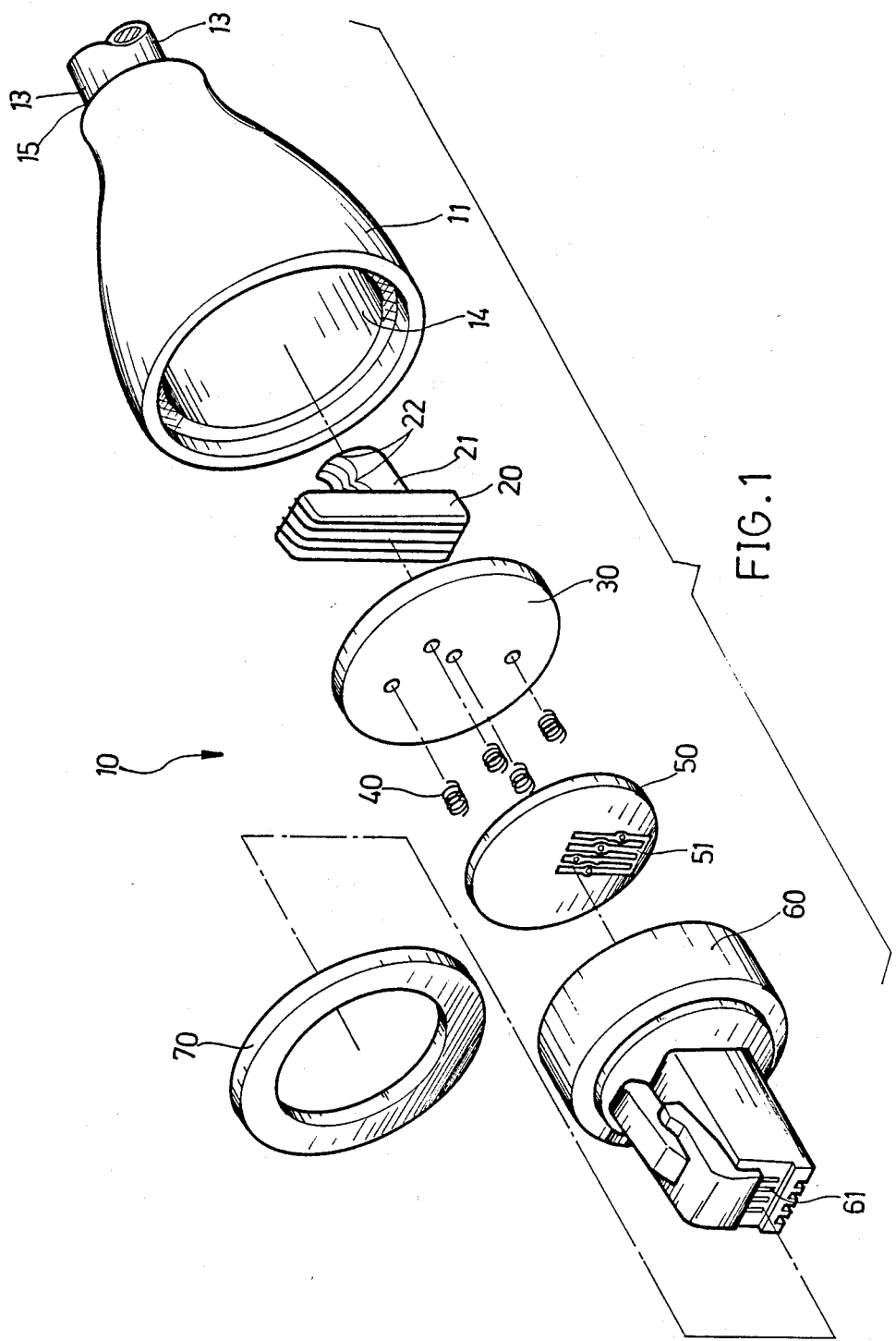
FIG. 1 is an exploded view of a first practical embodiment of the rotary plug of the preset invention.
Figure 2:
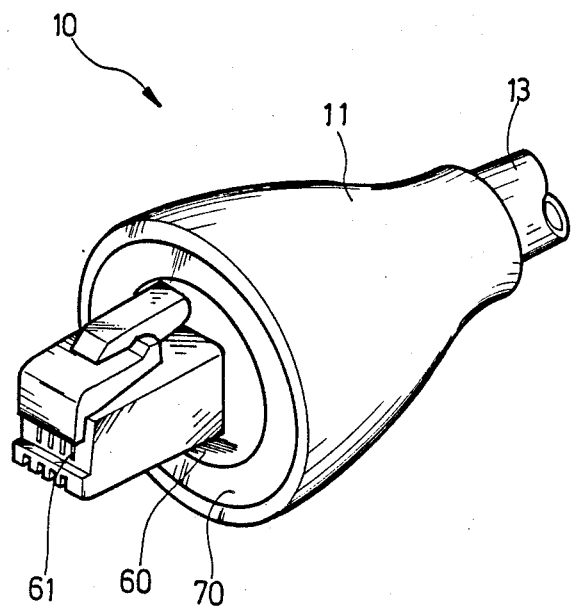
FIG. 2 is an external view of the first embodiment when assembled.
Figure 3:
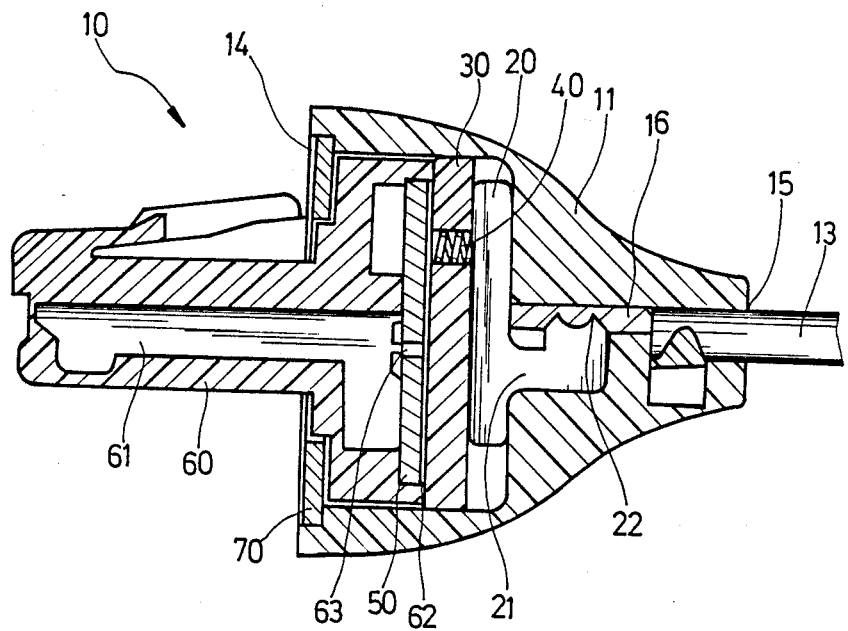
FIG. 3 is a sectional view taken through FIG. 2.
Figure 4:
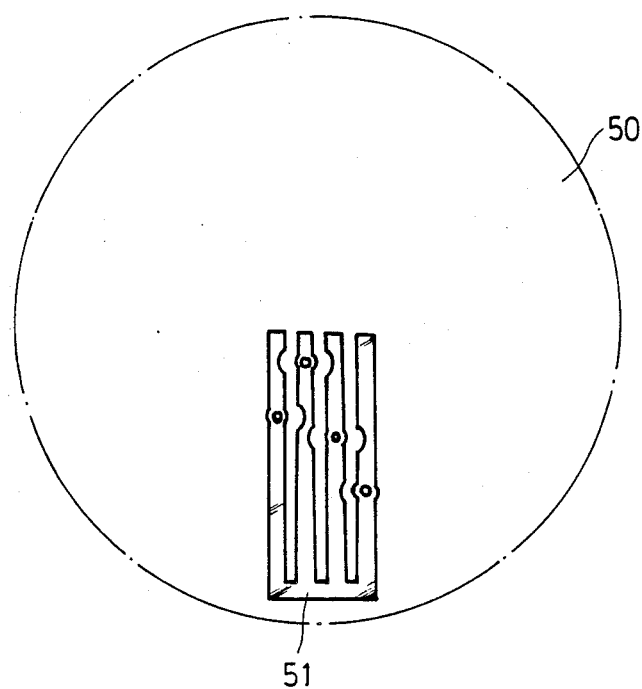
FIG. 4 is a plane view of the linear circuit on the front side of the dual surfaced printed circuit board in the first embodiment.
Figure 5:
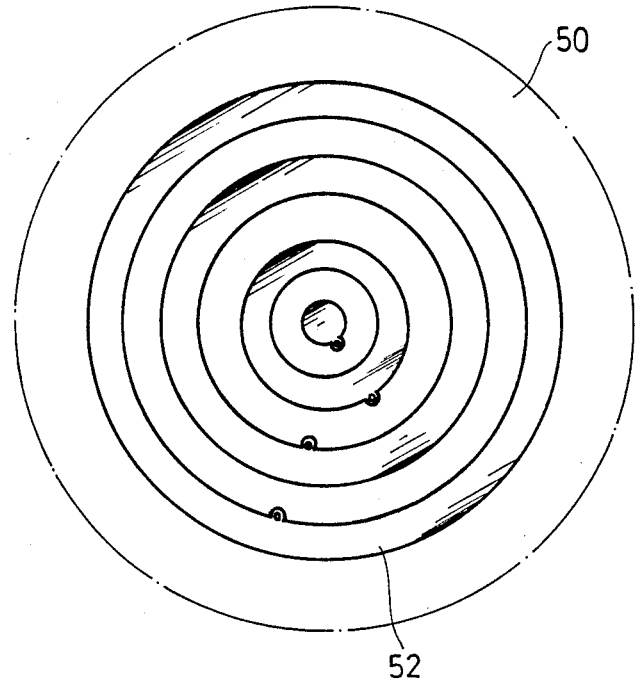
FIG. 5 is a plane view of the circular circuit on the rear side of the circuit board.

Referring to FIGS. 1, 2 and 3, the first preferred embodiment of the rotary plug generally designated 10 includes a casing 11 which has a horn shape and which includes openings 14 and 15 at its two opposite ends. A cable 13 is inserted into the casing 11 through the opening 15 on the tail end of casing 11. A plastic coating of the cable 13 is pierced by sharp hooks 22 on the tail end of the conductive laminates 21 which are held in a conductive laminate seat 20 to be fixed in the casing. This makes electrical contact between the conductive laminates 21 and respective copper conductors 16 inside the cable 13. Front ends of the conductive laminates 21 contact respective conductive springs 40, which penetrate holes 31 of a fixing board 30 in casing 11. Each conductive spring 40 contacts one circular circuit 52 on a rear surface of a dual surfaced printed circuit board 50. The dual surfaced printed circuit board 50 has a front linear circuit 51 and a rear circular circuit 52, circuits 51 and 52 having respective conductive portions which are connected to each other. As mentioned previously, the rear circular circuits 52 make contact with the cable 13 via conductive springs 40 and the conductive laminates 21. On the other hand, the front linear circuits 51 contact convex contacting points 63 on the tail end of conductive laminates 61 which are fixed inside the body of a plug 60. Accordingly, the conductors 16 of cable 13 are electrically connected to the conductive laminates 61 fixed inside the body of the plug 60.

The conductive laminate seat 20, fixing board 30, conductive springs 40, dual surfaced printed circuit board 50 and the body of the plug 60 are inserted into the casing 11 through the front opening 14. The front opening 14 is closed by a fixing ring 70 which retains the elements inside casing 11 without any danger of them falling out. Components such as cable 13, conductive laminate seat 20, fixing board 30 and the conductive springs 40 are all fixed and unable to move relatively to casing 11. The dual printed circuit board 50 and the body of plug 60 are able to rotate freely in casing 11. The dual printed circuit board 50 and the body of plug 60 are connected integrally with each other and move together.

While the dual printed circuit board 50 rotates along with the body of plug 60, the rear side of the dual printed circuit board 50 contacts the immovable conductive springs 40 at circular circuits 52. The rotation of the printed circuit board 50 causes the contact point of the conductive springs 40 to move around the circular circuits 52. The rotary plug 10 thus can maintain conduct between cable 13 and plug 60 at all times. If the body of plug 60 and the dual printed circuit board 50 are maintained motionless, and the cable 13 rotates along with casing 11, the rotating conductive springs 40 still maintain contact with the stationary circular circuits 52 without fear of cut-off.

The above rotary plug 10 is especially applicable to frequently twisting telephone equipment. For example, in a telephone used in daily life, the cable which connects the telephone body to the telephone hand set is usually twisted.

Figure 6:
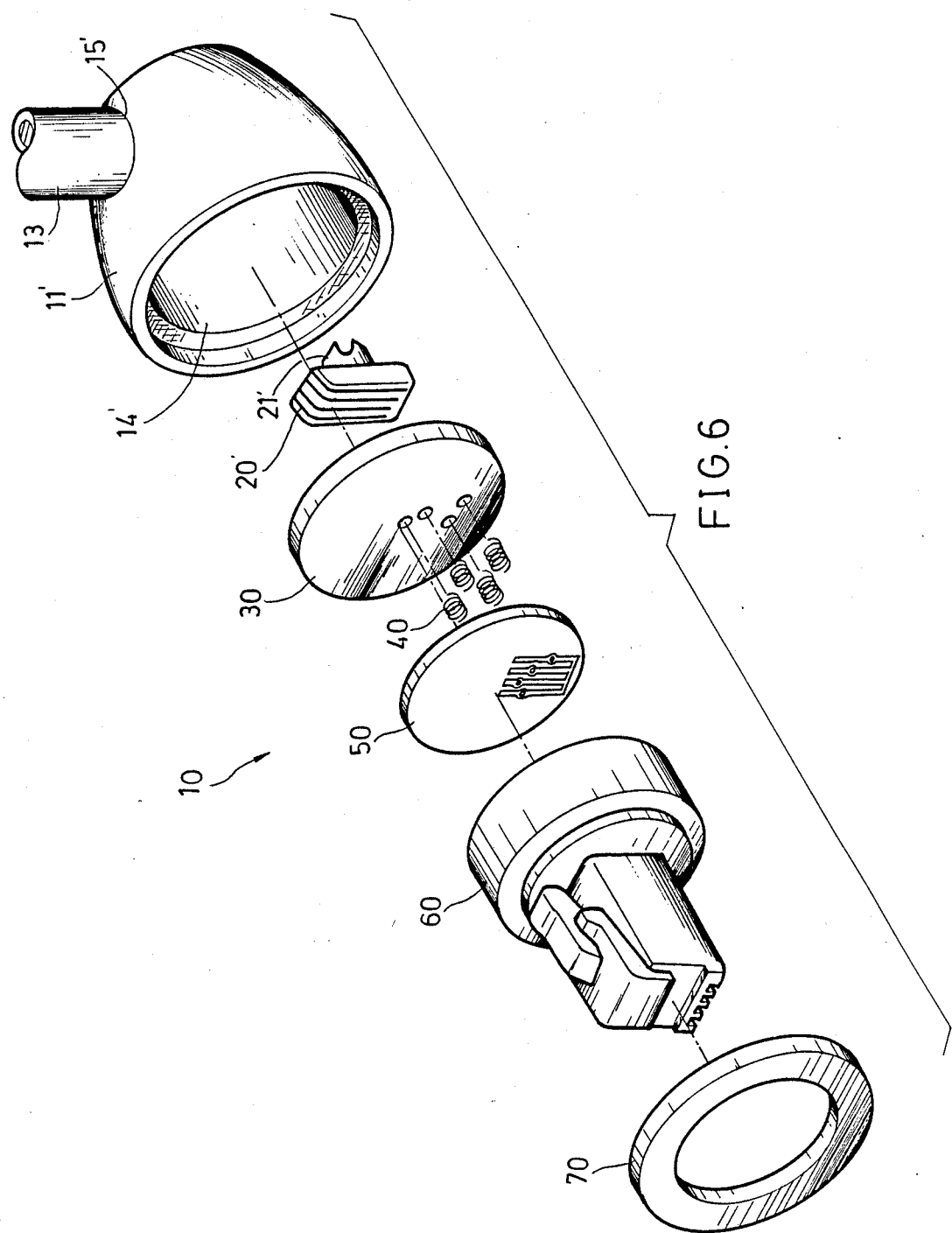
FIG. 6 is an exploded view of a second practical embodiment of the rotary plug of the present invention.
Figure 7:
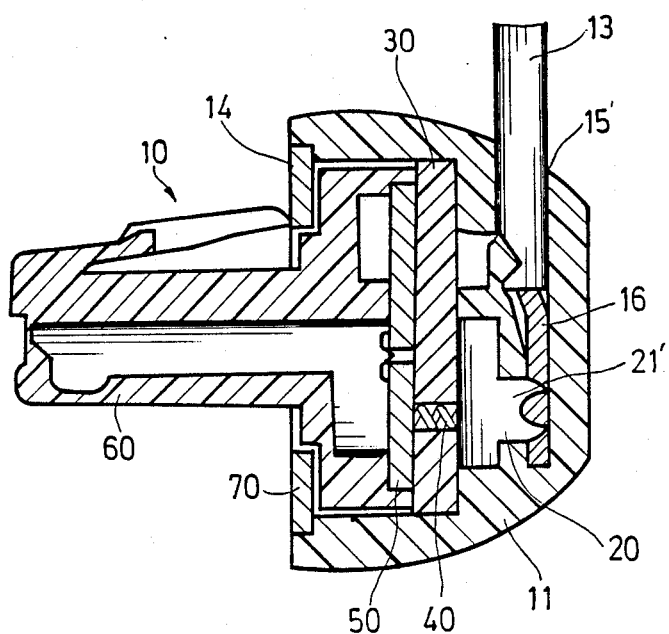
FIG. 7 is a sectional view of the second embodiment when assembled.

Referring to FIGS. 6 and 7, a practical embodiment of the invention which is applicable to the rotary plug used on the cable of a telephone hand set, is shown at 10'. The main feature of this embodiment is to change the direction of insertion of the cable 13 into casing 11' in order to meet the requirements of the posture of a user when holding the telephone hand set. As shown in FIGS. 6 and 7, the cable 13 is inserted into casing 11' through a side wall near the tail end of casing 11'. Under such circumstance, the shape of casing 11' is slightly different from conventional ones to adapt with this change. The casing 11' has a front opening 14' and an opening 15' on the side wall thereof. In order to cope with the direction of insertion of cable 13 into casing 11', the shape of the conductive laminate seat 20' and conductive laminates 21' are also different slightly from those in the first embodiment. As for other components, such as fixing board 30, conductive springs 40, dual printed circuit board 50, the body of plug 60 and fixing ring 70, these are all identical in design and shape with those in the first embodiment. The rotary plug 10' of the second embodiment is applicable to the connecting cable of the telephone hand set, and the whole assembly may be reduced in size further beyond that of the first embodiment in order to save material and take up less space.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

I claim:

1. A plug for connection to a cable having a plurality of conductors, comprising:
    a casing for receiving a portion of the cable therein;
    a plurality of first conductive laminates fixed inside said casing, each conductive laminate being adapted to be in electrical contact with one conductor of the cable;
    a plug having a plug body mounted for rotation to said casing, said body having a portion inside said casing and a portion extending out of said casing, a plurality of second conductive laminates in said body, a portion of each second conductive laminate extending out of said casing;
    a dual surfaced printed circuit board fixed to said body and rotatable therewith in said casing, said dual surfaced printed circuit board having a front linear circuit thereon and a rear circular circuit thereon, said linear and circular circuits being electrically connected to each other, said front linear circuit electrically contacting one of said second conductive laminates of said body, and said rear circular circuit moveably and electrically contacting one of said first conductive laminates; and
    retaining means for retaining said plug body for rotation in said casing and for holding said rear circular circuit in moveable contact with one of said first conductive laminates.

2. A plug according to claim 1 further comprising a fixing board mounted in said casing between said first conductive laminates and said dual surfaced printed circuit board, said fixing board being fixed inside said casing and having at least one hole therethrough, and a conductive spring in said hole electrically and moveably contacting said rear circular circuit, said spring electrically contacting one of said first conductive laminates.

* * * * *